July 16, 1940.  W. L. JEFFREY  2,208,262
TREE TRANSPLANTER
Filed March 23, 1939  2 Sheets-Sheet 1
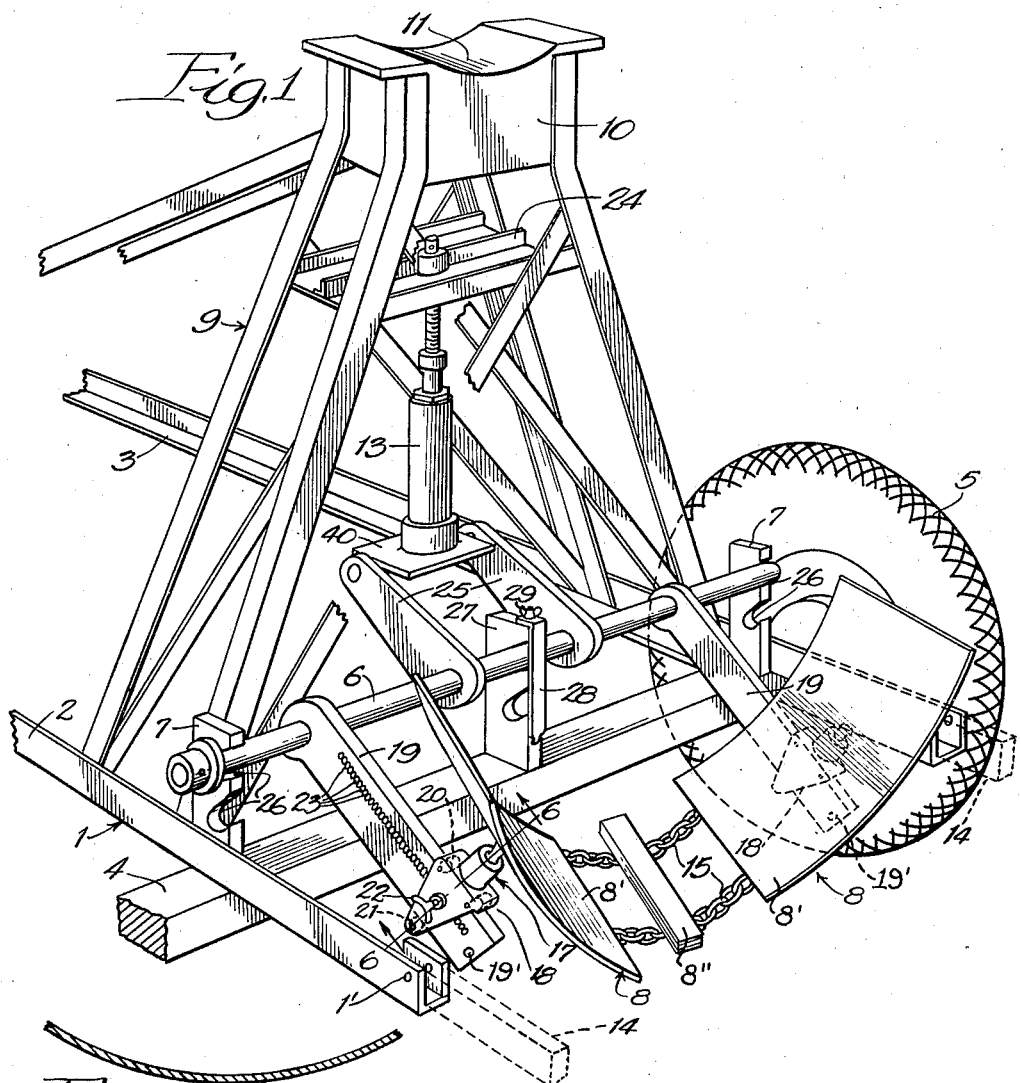
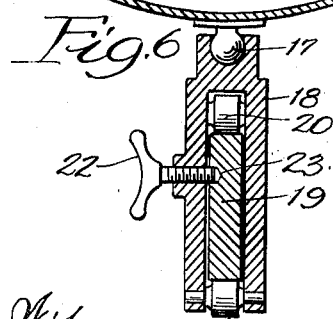

July 16, 1940.  W. L. JEFFREY  2,208,262
TREE TRANSPLANTER
Filed March 23, 1939  2 Sheets-Sheet 2
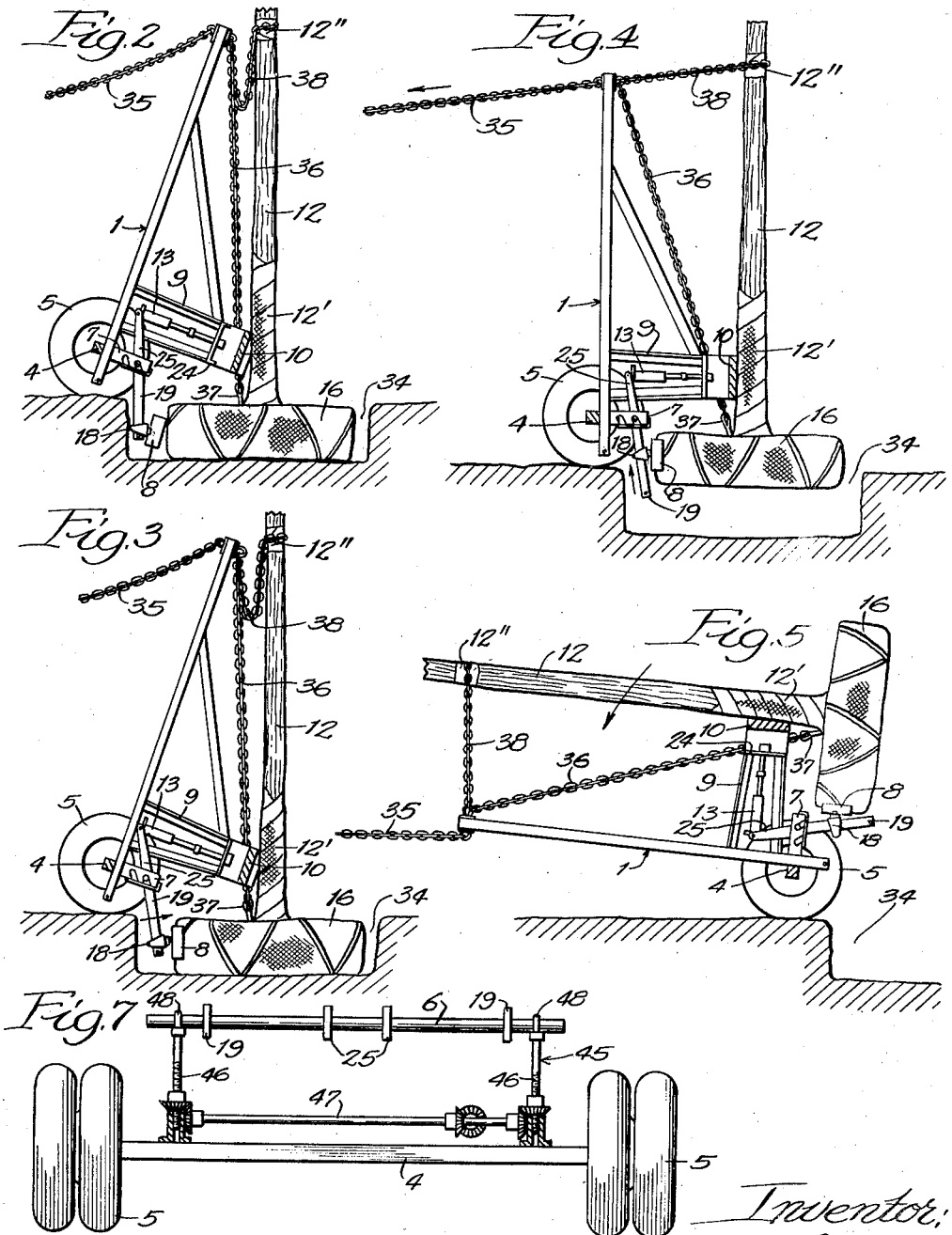

Patented July 16, 1940

2,208,262

UNITED STATES PATENT OFFICE 2,208,262

TREE TRANSPLANTER

Wallace L. Jeffrey, Fulton, Mo.

Application March 23, 1939, Serial No. 263,815

9 Claims. (Cl. 214—3)

This invention relates generally to tree transplanters and more especially to devices of this kind having mechanically operative parts. My purpose is to provide a better apparatus as a whole, but the art is considerably developed already and hence my invention is directed to overcoming certain defects and increasing the general usefulness of such machines.

There is increasing need for transplanting large trees of various kinds and under a wide range of conditions. This often calls for engineering equipment and skill depending on size, weight and character of trees, nature of soil, weather conditions and time periods available.

The main objects of my invention are to provide an improved device of the kind referred to for taking up, transporting and re-setting a tree in such a manner that the bulk of the earth in which the roots of the tree are naturally embedded may be carried undisturbed to the place of transplanting and the trunk of the tree being so supported as to avoid injury to the bark; to provide a device of the class described wherein the supporting wheels may rest always at ground level as while loading, moving and unloading a tree; to provide an apparatus adapted to give direct support for the ball of earth at all times during the transfer operation and especially when the tree is being tilted from its natural vertical position to the recumbent position it assumes during transportation; to provide an operative and adjustable cradle for holding and carrying the ball of earth in place about the roots; to provide adjustment therefor so as to accommodate any reasonable size of earth ball; to provide for carrying a large part of the weight of the tree on such a cradle; to provide a transplanter device of this character which will assure against skinning the bark from the tree trunk or otherwise injuring the trunk; to provide a device of this character by which one can accurately position the tree in the new location without lifting the tree from the hole or bodily repositioning the transplanter; to provide for shifting the cradle alone to enable this positioning; to provide various positioning adjustments for the carrying cradle in a general plane perpendicular to the wheel axle; to adopt such a conveyor for propelling as a trailer; and to provide a device of this character which may be simple in construction and operation and inexpensive to manufacture.

This invention is illustrated by the accompanying drawings in which:

Figure 1 is a perspective view of my new and improved transplanter with parts broken away.

Figs. 2 to 5 are side elevations of my device showing in sequence the steps in removing a tree, and in reverse order the steps in setting a tree.

Fig. 6 shows a sectional view taken on the line 6—6 of Fig. 1.

Fig. 7 is a side view of a Weaver jack style of construction which may be employed for raising and lowering the main pivot shaft, in place of manual positioning of the shaft in the diagonally-pocketed uprights of Fig. 1.

In the construction shown by Figs. 1 to 6, the chassis 1 is mainly an oblong frame including side bars 2 and 3 and an axle bar 4 set crosswise thereof near the load-carrying end, the remote ends of bars 2 and 3 being connected in any desired manner. This frame is mounted on a pair of wheels 5.

Directly above the wheel axis and parallel with bar 4 is a pivot shaft 6 journalled at its ends on chassis posts 7, on which shaft the cradle 8 is rockably mounted.

Rigidly set on frame 1, immediately back of shaft 6, is a pyramidal bracket 9 capped with a bunk block 10 hollowed at 11 on its upper side to receive the tree trunk 12.

Mounted in bracket 9 is a jack 13 connected to control the tilt and position of cradle 8, as will be described.

In loading and unloading the device chassis 1 is tilted up more or less about axle bar 4 as shown in Figs. 2, 3, and 4; but its road position is horizontal, about as in Figs. 1 and 5; and travel is to the right as thus viewed.

The ends of chassis bars 2 and 3, projecting beside the cradle 7, are adapted to receive detachable extension elements 14, as shown, by dotted lines on Fig. 1. These extensions may be rearward parts of a tractor, not shown, or mere couplers for connecting the chassis 1 to a tractor or the like, preferably in such manner as to prevent appreciable rocking of chassis 1 and its load on axle bar 4 in travel.

The cradle 8 is sectional in character and comprises a pair of main plates 8' and a small intermediate plate 8", all connected by a pair of parallel chains 15. These cradle plates are curved and arranged arcuately to face upwardly as viewed in Fig. 1, so as to receive the tree-base or root-ball 16 scoopwise and embrace it.

Each main plate 8' is provided on its underside with a ball-and-socket bearing or joint 17 whereby it is connected to a slide-carriage 18 adapted for positional adjustment lengthwise of a corresponding arm 19 fixed on the shaft 6.

These arms 19 are in such spaced relation as to hold the cradle in receptive position for the root-ball. Each carriage has top rollers 20 and a bottom roller 21 to minimize friction. A thumb screw 22 on carriage 18 to engage depressions 23 on bar 19 enables manual locking of carriage 18. Stop lugs 19' are provided adjacent the free ends of arms 19 to prevent the cradle from being displaced therefrom.

In order that the cradle 8 may be forcibly adjusted for elevation as viewed in Fig. 1, I provide that the screw-jack 13 shall be operable downwardly from the top part 24 of bunk bracket 9 against a pair of lever arms 25 fixed on shaft 6 and disposed in the opposite direction from cradle arms 19. These arms 19 and 25 are about in a common plane which is generally parallel with chassis frame 1, but tilts relative thereto.

In order to provide a wide range of adjustment for controlling the elevation of cradle 8, I mount the shaft 6 selectively in a vertical row of notches 26 in each of the two end posts 7 in front of bracket 9. Shaft 6 is secured in whichever set of notches it is selectively placed, by means of a central lock comprising a slotted post 27 set on bar 4 and a manual locking clamp 28 held by a wingnut 29.

*Operation*

Whenever a tree is to be transplanted a trench 34 is dug about the base, of sufficient diameter and depth to provide an appropriate root-ball and to provide working space, depending upon the kind and size of the tree and the nature of the soil. This root mass or ball 16 is first carefully wrapped and bound so as to protect it and prevent loosening of the earth in transplanting, as will be understood. I also wrap the trunk near the ground so as to protect the bark as shown at 12'.

Next, with the wheels resting on the level ground I tilt the chassis 1 to stand uprightly and to lean nearly against the tree at the top, substantially as shown in Fig. 2, with bunk 11 bearing against the trunk at 12' and with the cradle 8 projecting downward into the trench and bearing against the root-ball 16. The wheels 5 are locked to prevent rolling. At this time pivot bar 6 is preferably in its lowest notch and jack 13 is retracted. The chain 35 is adjusted so that one branch 36 extends from the anchor 37 in the tree-ball near the tree trunk to the remote end of chassis 1 and another branch 38 extends from the remote end of the chassis to the closely adjacent part 12" of the tree, with ample slack as shown in Fig. 2.

The jack 13 is then adjusted to set cradle 8 snugly against the root-ball. Tension is then applied to the free end of the chain 35 extending from the top of the chassis, as to a truck, so as to tilt chassis 1 to its upright position shown in Fig. 4, with the tree trunk parallel to the chassis frame.

It is to be noted that in this initial tilting of chassis 1 the upward pull on chain branch 36 lifts the tree partly out of its hole and at the same time the root-ball 16 rides upward somewhat in the unlocked cradle 8 on the arms 19, say from twelve to eighteen inches, and the bunk 11 bears lightly against the wrapped tree trunk at 12'. The cradle carriages 18 are next locked by setting the thumb screws 22 in corresponding notches 23.

The jack 13 is then operated against pivot plate 40 to tilt the leverage arms 19 and 25 so as to push the trunk 12 out of appreciable pressure on bunk 11.

Continued pull on the chain 35 serves to swing the chassis and tree over to the position shown in Fig. 5 with the root-ball and base of the tree resting mainly on cradle 8, and perhaps more-or-less or partly on the bunk 10. Cradle 8 is then further adjusted by means of jack 13 so as to carry substantially the entire load and so partially relieve bunk pressure on the tree trunk.

The adjustment in elevation of the cradle rocker axle 6 is greatly facilitated by the form of elevator shown in Fig. 7. Here instead of the pocketed posts 7 on chassis 1 I rigidly mount a Weaver style of jack 45 in place thereof and seat the pivot rod 6 thereon. This jack of Fig. 7 comprises mainly a pair of spaced extensible uprights 46 and an operative gear connector rod 47, the jack elements 46 being cooperative. At the top of each part 46 is a pocket 48 to receive a corresponding end of bar 6.

As soon as the tree and chassis reach the horizontal position of Fig. 5 steps are taken to connect the cradle end of the chassis to the rear end of a tractor or the like, so that in transit the top of the tree will trail behind.

On arival at the new location the tractor is disconnected and the chassis is set substantially as in Fig. 5, the wheels 5 again being locked. The tree and chassis are then tilted to the right as here shown, subject to chain control and the tree is lowered into the new hole. In thus setting the tree the reverse of the taking up operation in the main is substantially followed, as will be understood.

It is to be noted however that in order to center a tree exactly according to a particular survey or plat it may be necessary to lift and readjust a tree somewhat after it is first seated in the hole. For instance, if the tree is too near the bank next to the chassis the jack is retracted and then with the cradle against the earth-ball and the tree lifted the jack is extended sufficiently to push the tree over to its desired position.

As will be apparent, the relative positioning of the carrier plates 8' and 8" of cradle 8 is somewhat variable due to the flexibility of chains 15. The effective length of these chains may of course be varied as will be understood. Although I have shown the arms 19 as set in fixed spaced relation on pivot 6, I may provide for variable spacing, as by means of set screws or otherwise.

It is to be understood that some of the details set forth may be altered or omitted without departing from the spirit of my invention as defined by the following claims.

I claim:

1. A tree transplanter comprising a chassis having at one end a stationary bunk to receive the tree trunk, a cradle to receive the rootball and automatic slidable means to adjust the position of said cradle relative to said bunk to prevent the tree trunk from thrusting its entire weight against said bunk during the period the tree is being removed from the ground.

2. A tree transplanter comprising an oblong frame with which the tree may be parallel in transit, an outstanding stationary bunk strut on one end thereof to receive the trunk base of the tree and a cradle adjacent to said strut to receive and carry the root-ball, said cradle being automatically and slidably adjustable relative to said frame and strut during the period the tree is being removed from the ground.

3. A tree transplanter comprising an oblong chassis having an axle and wheels adjacent to the root carrying end, a bunk adjacent said axle to receive the tree trunk, a positionally adjustable cradle projecting from the axle end of the chassis to receive the root-ball of the tree and a chain attachable at one end to the root-ball and intermediately of its length to the remote end of said chassis, said chain having a branch to extend from said remote end to the tree trunk.

4. A device of the class described comprising an oblong chassis, a wheeled axle on which said chassis is mounted for tilting on one end relative to its normal horizontal position, a trunk receiving bunk fixed above said axle, a root-ball receiving cradle secured to the axle end of said chassis in shiftable relation thereto for adjustment in height and in horizontal position.

5. In a tree transplanter an adjustable support for the root-ball comprising a cradle to receive the ball, pivotally mounted members to support and carry said cradle and manual means incorporated in and part of said tree transplanter to tilt said members, said members each having an arm to which said cradle is attached and an opposite arm to which tilting power may be applied.

6. A tree transplanter chassis having a transverse pivot shaft adjacent to one end, a root-ball cradle on one side of said shaft and a trunk-receiving bunk bracket on the other side, a jack carried by said bracket and leverage means on said shaft operatively connecting said jack and cradle.

7. In a tree transplanter a root-ball cradle comprising a pair of main plates and an intermediate plate all flexibly connected, a pair of parallel arms on which the two main plates are slidably mounted, a shaft on which said arms are co-tiltably mounted, and means to regulate the tilt of said arms.

8. A tree transplanter comprising a chassis having a root-ball cradle adjustably mounted thereon, the adjusting means including a rock shaft held horizontally, means to adjust the elevation of said shaft, leverage means fixed to said shaft, a jack operatively connected to said leverage means for varying the tilt thereof and said cradle being carried movably by said leverage means.

9. In a tree mover an adjustable cradle device comprising a rockably mounted shaft having side arms and a cradle proper carried thereby, the latter having a rockable support at each side and said arms each having an anti-friction carriage rideable thereon to receive a corresponding cradle support.

WALLACE L. JEFFREY.